United States Patent [19]
Karube

[11] Patent Number: 4,977,574
[45] Date of Patent: Dec. 11, 1990

[54] LASER OSCILLATOR

[75] Inventor: Norio Karube, Machida, Japan

[73] Assignee: Fanuc Ltd., Yamanashi, Japan

[21] Appl. No.: 408,484

[22] PCT Filed: Jan. 6, 1989

[86] PCT No.: PCT/JP89/00011

§ 371 Date: Aug. 21, 1989

§ 102(e) Date: Aug. 21, 1989

[87] PCT Pub. No.: WO89/06449

PCT Pub. Date: Jul. 13, 1989

[30] Foreign Application Priority Data

Jan. 8, 1988 [JP] Japan .................................. 63-2153

[51] Int. Cl.⁵ ............................................ A01S 3/081
[52] U.S. Cl. ......................................... 372/93; 372/92;
372/94; 372/102; 372/106; 372/107; 372/108
[58] Field of Search ................... 372/93, 94, 92, 27,
372/102, 99, 106, 107, 108

[56] References Cited

U.S. PATENT DOCUMENTS 3,496,483 2/1970 Max et al. ............................. 372/27
4,084,883 4/1978 Eastman et al. ..................... 350/152
4,340,969 7/1982 Hamilton et al. ..................... 372/99
4,757,514 7/1988 Hoag ................................... 372/106

FOREIGN PATENT DOCUMENTS 0211989 10/1985 Japan .................................. 372/106
0211990 10/1985 Japan .................................. 372/106

Primary Examiner—Georgia Epps
Attorney, Agent, or Firm—Staas & Halsey

[57] ABSTRACT

A laser oscillator is provided with a folded laser resonator which includes an output coupling mirror (4), a rear mirror (10) and folding mirrors (11,12). The rear mirror (10) has a maximum reflectivity with respect to a linear polarization component of the laser beam, in which the linear polarization component has an E vector the direction of which is rotated from an incident plane of the nearest folding mirror by $\pi/4$. The folding mirrors (11,12) function as a whole as a phase retarder imposing a $\pi/2$ phase delay with respect to parallel and perpendicular polarization components of the laser beam, and accordingly, a circularly polarized laser beam is obtained from the laser oscillator.

13 Claims, 5 Drawing Sheets

10a POLARIZATION DIRECTION

LASER OSCILLATOR

BACKGROUND OF THE INVENTION

1. Field of the Invention

The present invention relates to a high-output power laser oscillator for use in a laser cutting machine for cutting metals or non-metals. More particularly, the invention relates to a laser oscillator which generates a circularly polarized laser beam.

2. Description of the Related Art

It is known in the art that, when cutting with a laser beam, a circularly polarized beam is preferable, and conventionally, to provide the circularly polarized beam, a linearly polarized beam generated directly from a laser oscillator is converted to a circularly polarized beam with the use of an external optical unit.

Such a conventional arrangement is shown in FIG. 9, in which only the optical unit is illustrated and conventionally known laser exciting components, such as a discharge tube, are omitted. The arrangement of FIG. 9 includes a rear mirror 1, folding mirrors 2 and 3, and an output-coupling mirror 4, all of which constitute a laser resonator. A laser beam 9 from the resonator exhibits a linear polarization having an electric vector direction orthogonal to a plane determined by three optical axes 7a, 7b and 7c. In FIG. 9, this plane is rotated by $\pi/4$ about the optical axis 7a. The beam 9 from the resonator has a linear polarization and a polarization direction thereof is inclined by $\pi/4$ with respect to a horizontal plane. This beam 9 is reflected by phase retarders 5 and 6, whereby the beam 9 is given a circular polarization.

The above-described conventional arrangement is disadvantageous in the following respects.

First, a large number of optical elements are required, which increases cost. Secondly, the system is large in size and is complicated. Finally the arrangement of the external optical system must be as precise as that of the laser resonator. In any other case, the directional stability of the laser beam will be lowered, and accordingly, the cutting characteristics degraded.

Summary of the Invention

Accordingly, an object of the present invention is to eliminate the above disadvantages of the conventional laser oscillator.

In order to attain the above and other objects, there is provided a laser oscillator for oscillating a laser beam, the oscillator comprising an output coupling mirror, at least one folding mirror operating as a whole as a phase retarder imposing a $\pi/2$ phase delay with respect to parallel and perpendicular polarization components of the laser beam, and a rear mirror having a maximum reflectivity with respect to a linear polarization component of the laser beam, the linear polarization component having an E vector whose direction is rotated from an incident plane of the nearest one of the folding mirror by the $\pi/4$ phase.

The rear mirror ensures the maximum reflectivity of the above mentioned linear polarization component, so that the linear polarization is obtained in the optical path between the rear mirror and the nearest folding mirror. This folding mirror or mirrors serve as a phase retarder as a whole and imposes a phase delay of $\pi/2$ so that the resultant beam has a circular polarization.

DETAILED DESCRIPTION OF THE PREFERRED EMBODIMENTS

Embodiments of the present invention will be hereinafter described in specific detail with reference to the drawings.

Figure 1:
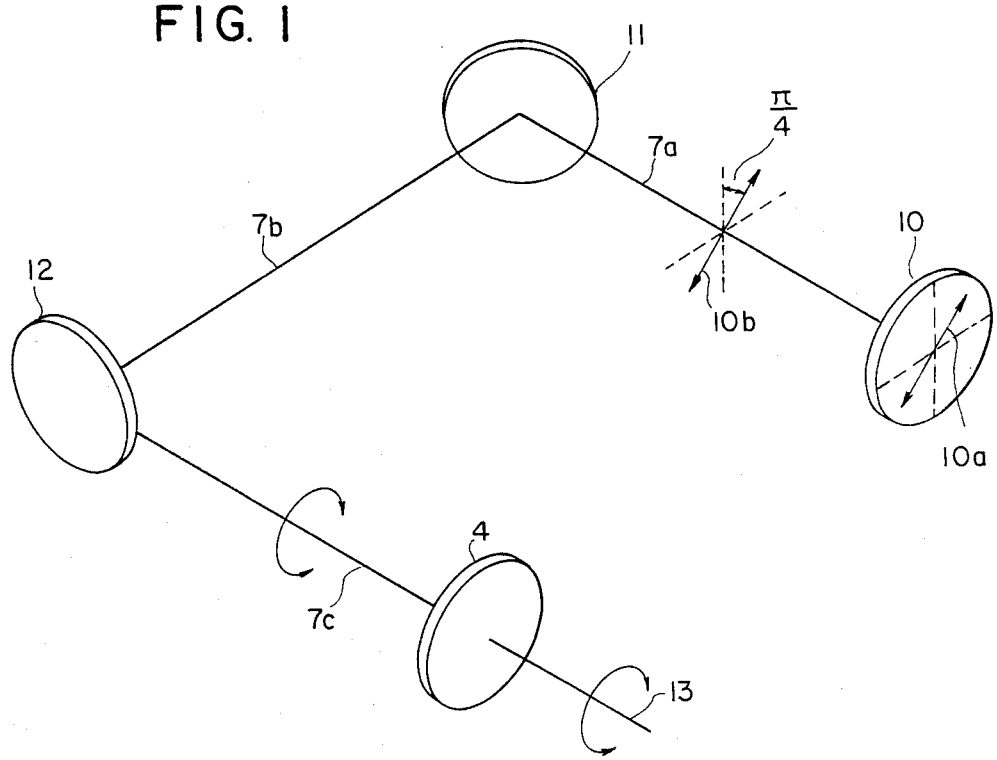
FIG. 1 is a schematic diagram showing an arrangement of a laser oscillator according to a first embodiment of the present invention.

FIG. 1 is a schematic diagram showing an arrangement of a laser resonator according to a first embodiment of the present invention, which includes a rear mirror 10, folding mirrors 11 and 12 and an output-coupling mirror 4. Laser pumping components such as a discharge tube, which together with the laser resonator constitute a laser oscillator, are not illustrated in FIG. 1, for simplification.

A feature of this arrangement lies in that the rear mirror 10 ensures the maximum reflectivity of a linear polarization beam E vector having a direction as indicated by an arrow 10a, a detailed description of which will be given later. Another feature of this arrangement lies in the folding mirrors 11 and 12, both of which serve as a phase retarder imposing the $\pi/2$ phase delay. Note, although an amount of phase delay of each of the folding mirrors 11 and 12 can be determined as desired, the total amount of phase delay imposed by the two folding mirrors 11 and 12 is $\pi/2$. Such a folding retarder is readily available on the market.

In the resonator arranged as shown, the laser beam in the region around an optical axis 7a exhibits a linear polarization having the E vector direction as indicated by arrows 10a and 10b, which direction is shifted by $\pi/4$ with respect to the plane defined by the optical axes 7a, 7b and 7c. In the region around the optical axis 7c, the laser beam exhibits a circular polarization. As such, the laser beam oscillation occurs in a composite polarization state within the resonator; that is, the polarization of the laser beam differs depending upon the location of the optical path. Again in the region around the optical axis 7a, the linear polarization is selectively exhibited because the reflection loss of the rear mirror 10 is low with respect to the polarization, whereas in the region around the axis 7c, the circular polarization is exhibited because the linear polarization beam is converted to the circular polarization beam by the folding mirrors 11 and 12 serving as the phase retarder.

The output coupling mirror 4 to be employed should not have any directionality in terms of reflectivity. Such a mirror is readily available, since most of the output coupling mirrors on the market do not have any directionality. Accordingly, the laser beam 13 taken out of the resonator has a circular polarization.

Provided that the rear mirror 10 does not have any directionality in terms of reflectivity, the oscillation in any polarization state would occur because the loss of oscillation in all of the polarization states is the square, so that the laser beam would have a random polarization. Therefore, the rear mirror 10 having a higher reflectivity in the polarization direction indicated by the arrow 10a must be employed.

Figure 2:
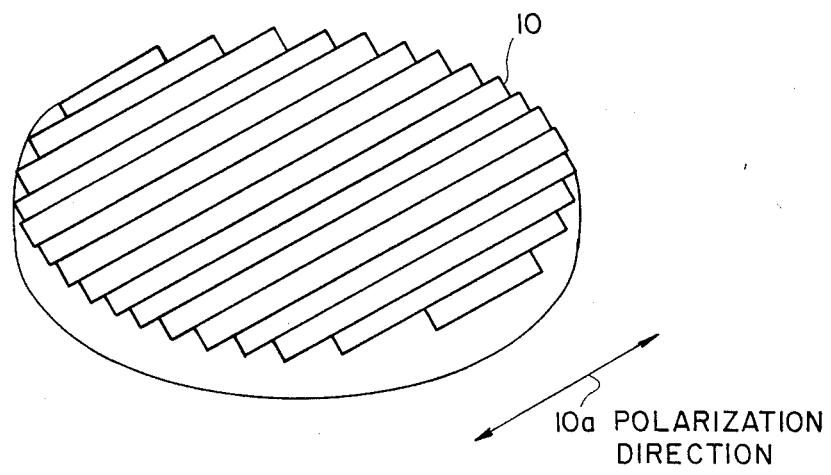
FIG. 2 is a schematic perspective view showing a rear mirror employed in the first embodiment.

Next, a description will be made of the structure of the rear mirror 10, which has a selective polarization direction. FIG. 2 is a schematic view showing the rear mirror 10, in which the grooves on the surface of the mirror 10 are depicted on an enlarged scale; the actual dimension of each groove is less than 10 $\mu$m, as described later. In the figure, the arrow 10a indicates the preferred polarization direction.

Figure 3:
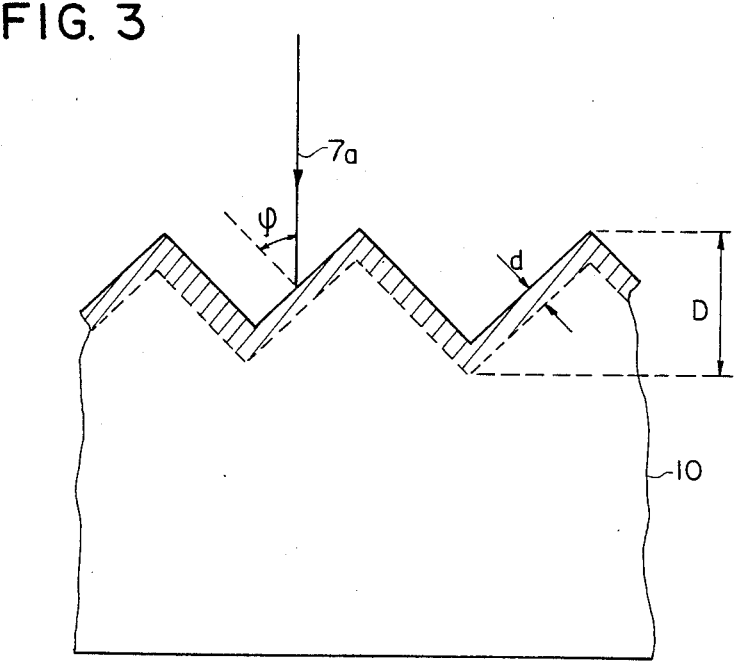
FIG. 3 is a vertical cross-sectional view showing a rear mirror provided with an array of deep grooves.

The function of the grooves of the rear mirror 10 will now be described. FIG. 3 is a vertical cross-sectional view showing the rear mirror 10, in which the line denoted by 7a indicates an optical axis of a standing-wave within the resonator. In the rear mirror having the grooves on the surface thereof, the light incident perpendicularly upon the overall plane surface of the mirror is obliquely incident upon a face of the groove. In addition, where a skin depth d with respect to the incident light wavelength is sufficiently small relative to the groove depth D, a reflection of the laser beam results from the oscillation of free electrons confined within the region defined by the skin depth. Therefore, as is well known in the art, the reflectivities in the vertical and parallel polarization components (which are defined so that the E vector is vertical and parallel relative to the incident plane, respectively) take different values. That is, $$Rv = \tan^2[\theta - \phi]/\tan^2[\theta + \phi]$$

$$Rp = \sin^2[\theta - \phi]/\sin^2[\theta + \phi]$$

where $\theta = \sin^{-1}(\tilde{n} \sin \phi)$, $\tilde{n}$ is a complex refractive index, and $\phi$ is an incident angle. The values of Rv and Rp depend upon $\tilde{n}$ and $\phi$. Note, in metals having a high reflectivity, such as copper, the value of Rp is normally larger by 1 to 2% than the value of Rv when $\phi = \pi/4$. When the parallel polarization component suffers less loss than the vertical polarization component, the laser mode is restricted only to the parallel polarization. The foregoing is a description of the case where d < D.

Figure 4:
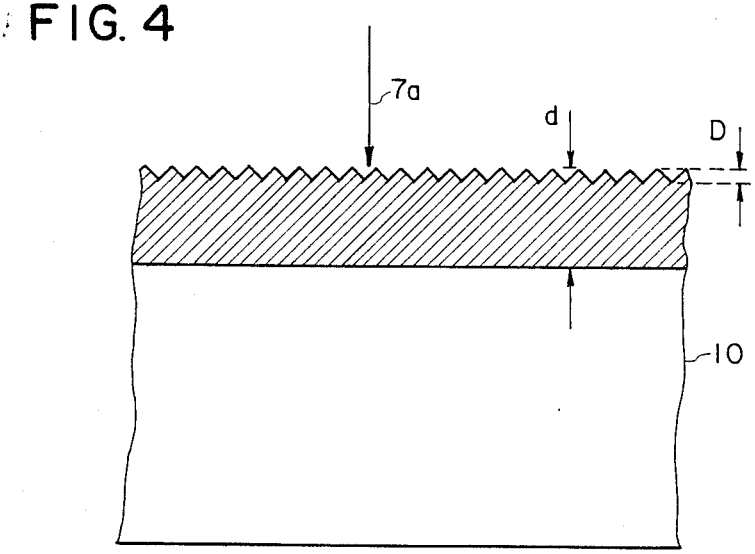
FIG. 4 is a vertical cross-sectional view showing a rear mirror provided with an array of shallow grooves.

Next, the case where d > D will be described with reference to FIG. 4, in which 10 indicates a rear mirror and the line denoted by 7a indicates the optical axis of the standing-wave within the resonator. Here again, d represents a skin depth and D a groove depth. In this case, the oscillation of free electrons occurs in the region of the skin depth d indicated by oblique lines. Therefore, it is apparent that the undulating surface arrangement on the mirror has no influence on the oscillation of most of the free electrons, wherein the values of Rv and Rp are equal to each other. As a result, the depth D of the groove has a lower limit D ≧ d. More specifically, the depth of the undulating pattern on the surface of each optical part, such as the internal folding mirror, must be equal to or greater than the skin depth.

Figure 5:
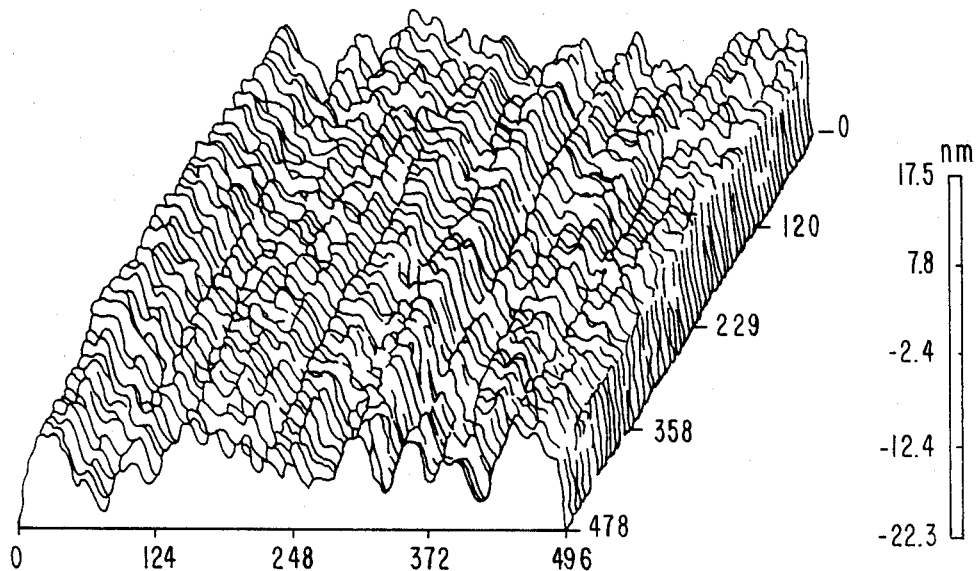
FIG. 5 is an enlarged perspective view showing a single crystal copper mirror cut by a diamond lathe.
Figure 6:
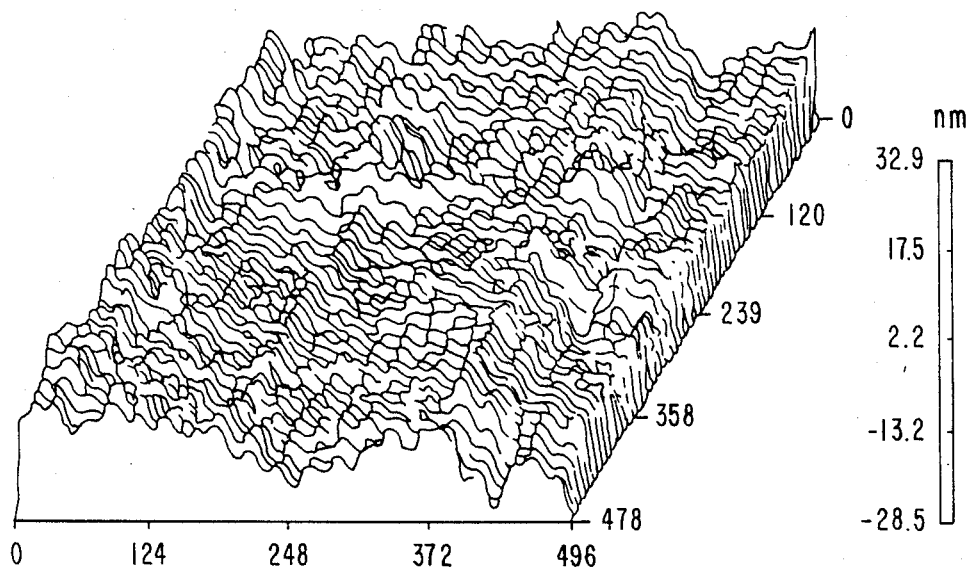
FIG. 6 is an enlarged perspective view showing a polycrystal copper mirror cut by a diamond lathe.

For example, when a $CO_2$ laser having a wavelength of 10.6 $\mu$m is incident upon a copper mirror machined by a diamond lathe, the skin depth d becomes 62 Å. The surface of such a copper mirror is undulating as shown in FIGS. 5 and 6, and thus complies with the requirement as mentioned above. FIG. 5 is an enlarged perspective view showing a mirror surface of a single crystal copper mirror machined by the diamond lathe. FIG. 6 is an enlarged perspective view showing a mirror surface of a polycrystal copper mirror machined by the diamond lathe. In FIGS. 5 and 6, a unitary dimension in the X and Y axes is $\mu$m and that in the Z axis is nm. The maximum depth in FIG. 5 is about 39.8 nm, and the same in FIG. 6 is 61.4 nm. In the present invention, it is preferable to use the single crystal copper mirror as shown in FIG. 5, since the grooves are in a arranged regular configuration.

Next, an upper limit of the groove depth D will be described. As the groove depth D increases from the value mentioned above and reaches a predetermined value, the mirror surface operates as a diffraction grating value. The reflection light in this case is diffracted not only to a zero-order term but also to high-order terms. This is not desirable in the present invention, since a substantial part of the reflectivity is lost and thus the output power is lowered.

If the groove depth is further increased, the laser beam is oscillated at a high efficiency only when each groove arrangement as shown in FIG. 3 acts precisely as a roof prism. In this case, the linear polarization can be obtained, and thus a folding mirror configured can be used in the present invention as such. Nevertheless, the following disadvantages arise.

First, it is extremely difficult to make such a mirror surface on which the roof prisms are precisely oriented and the cost of the final product is high.

Second, the regions corresponding to apexes and valleys of the undulating pattern do not contribute to the oscillation, and thus the output power is lower. Consequently, the described mirror surface preferably is not used in the present invention.

In summary, it is considered to be reasonable to determine that the upper limit of the groove depth D is equal to the laser wavelength. It should be noted that the wavelength of the $CO_2$ laser is 10.6 $\mu$m. In the present invention, a parallel engraving line pattern must be formed in one direction on the mirror surface, but the pattern need not be the roof prism arrangement as shown in FIG. 3.

Figure 7:
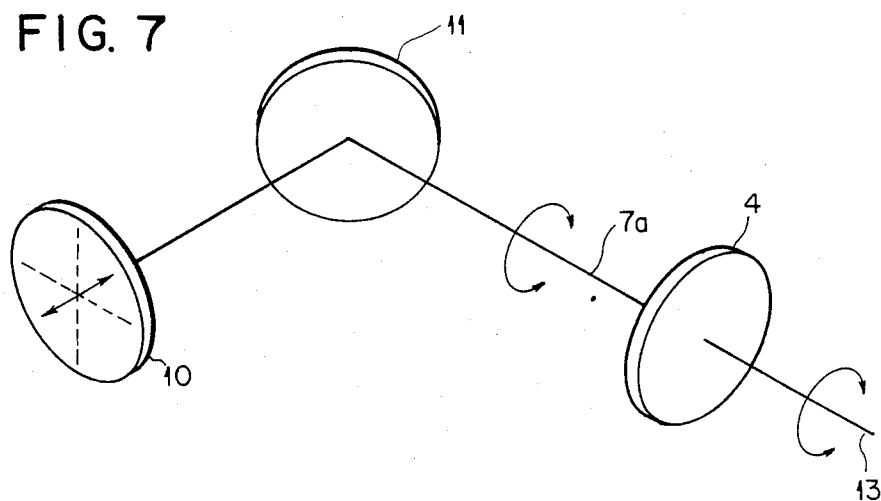
FIG. 7 is a schematic diagram showing an arrangement of a laser oscillator according to a second embodiment of the present invention.

A second embodiment of the present invention will now be described with reference to FIG. 7, which shows a rear mirror 10, a folding mirror 11, and an output coupling mirror 4; 13 denotes an output beam (circularly polarized beam). Namely, in this second embodiment, only one folding mirror is employed. The basic operational principle of the second embodiment is similar to that of the first embodiment except that, in this second embodiment, the phase delay of $\pi/2$ is imposed by a phase retarder composed of only one folding mirror 11.

Figure 8:
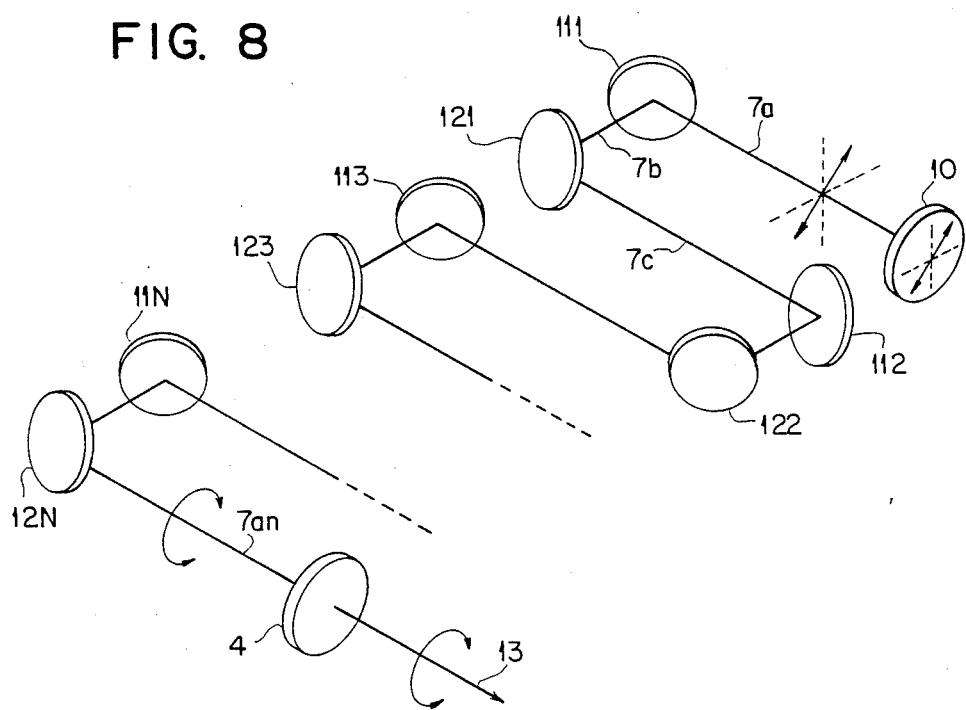
FIG. 8 is a schematic diagram showing an arrangement of a laser oscillator according to a third embodiment of the present invention.
Figure 9:
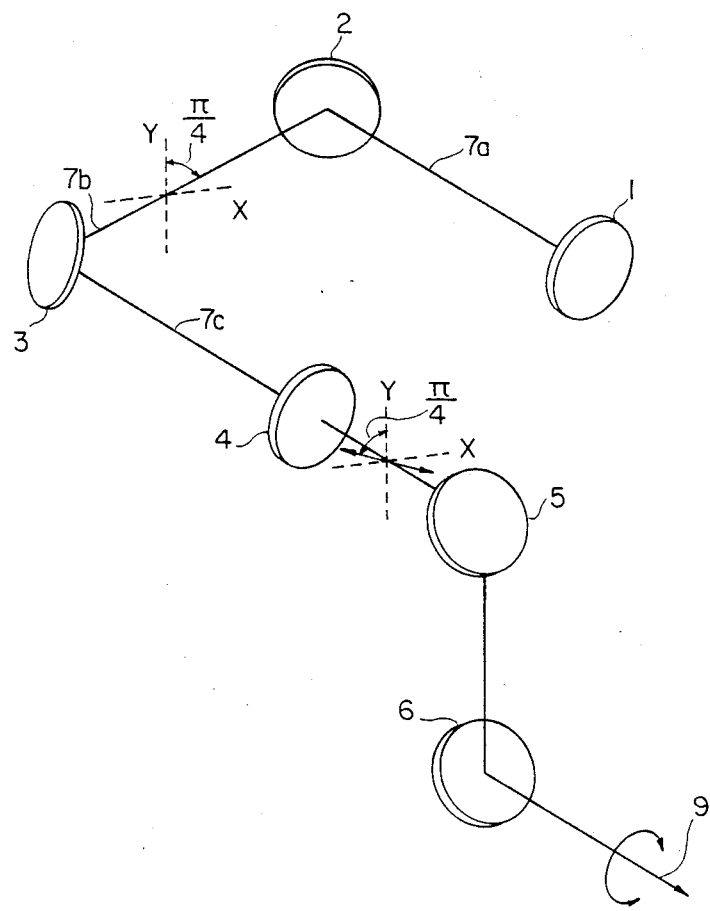
FIG. 9 is a schematic diagram showing a conventional laser oscillator for obtaining a circularly polarized beam.

Finally, a third embodiment of the present invention will be described with reference to FIG. 8, which shows a rear mirror 10, folding mirrors 111, 112, . . . 11N, 121, 122, . . . 12N, and an output coupling mirror 4. Namely, in this third embodiment, a multi-stage folded resonator having of a plurality of folding mirrors is provided, in which the phase delay of $\pi/2$ is imposed by those folding mirrors as a whole. The basic operational principle of this embodiment is similar to that of the first and second embodiments.

Although the present invention has been described by way of specific embodiments, it should be noted that the present invention is not limited to the foregoing embodiments and various changes and modifications may be made without departing from the scope and spirit of the invention.

As described, according to the present invention, the laser oscillator is arranged so that the laser beam irradiated therefrom has a circular polarization, and therefore, it is not necessary to provide specific parts for obtaining the circular polarization beam. Accordingly, in a laser cutting machine for use in metal or non-metal cutting, various advantages are obtained in terms of cost, structure, and properties, etc.

I claim:

1. A laser oscillator for oscillating a laser beam, said oscillator comprising:
   an output coupling mirror;
   a folding mirror operable as a phase retarder imposing $\pi/2$ phase delay with respect to parallel and perpendicular polarization components of said laser beam; and
   a rear mirror having a maximum reflectivity with respect to a linear polarization component of said laser beam, said linear polarization component having an E vector a direction of which is rotated by a $\pi/4$ phase from an incident plane of the folding mirror.

2. The laser oscillator as defined in claim 1, wherein said rear mirror has a surface on which an array of grooves is formed, said grooves being oriented in parallel with one another in one direction.

3. The laser oscillator as defined in claim 2, wherein said grooves have a depth falling within the range between a wavelength of said laser beam and a skin depth on said coupling mirror or said folding mirror at a wavelength of said laser.

4. The laser oscillator as defined in claim 2, wherein the depth of said grooves falls within the range between 60 Å and 10 $\mu$m.

5. The laser oscillator as defined in claim 2, wherein said rear mirror has a mirror surface formed by machining with a diamond lathe.

6. A laser oscillator for oscillating a laser beam, said oscillator comprising:
   an output coupling mirror;
   at least two folding mirrors operable as a whole as a phase retarder imposing $\pi/2$ phase delay with respect to parallel and perpendicular polarization components of said laser beam; and
   a rear mirror having a maximum reflectivity with respect to a linear polarization component of said laser beam, said linear polarization component having an E vector a direction of which is rotated by a $\pi/4$ phase from an incident plane of the nearest one of said at least two folding mirrors.

7. The laser oscillator as defined in claim 6, wherein said rear mirror has a surface on which an array of grooves is formed, said grooves being oriented in parallel with one another in one direction.

8. The laser oscillator as defined in claim 7, wherein said grooves have a depth falling within the range between a wavelength of said laser beam and a skin depth on said coupling mirror or said at least two folding mirrors at a wavelength of said laser.

9. The laser oscillator as defined in claim 7, wherein the depth of said grooves falls within the range between 60 Å and 10 $\mu$m.

10. The laser oscillator as defined in claim 7, wherein said rear mirror has a mirror surface formed by machining with a diamond lathe.

11. A laser oscillator for oscillating a laser beam according to claim 1, wherein, said oscillator comprising:
    the laser beam has circular polarization between the folding mirror and the output coupling mirror, and linear polarization between the rear mirror and the folding mirror.

12. A laser oscillator for oscillating a laser beam according to claim 6, wherein:
    the laser beam has a circular polarization between the output coupling mirror and a nearest one of the at least two folding mirrors and a linear polarization between the rear mirror and a nearest one of the at least two folding mirrors.

13. A laser oscillator for oscillating a laser beam, said oscillator comprising:
    an output coupling mirror;
    a folding mirror operable as a phase retarder imposing $\pi/2$ phase delay with respect to parallel and perpendicular polarization components of said laser beam; and
    a rear mirror having a maximum reflectivity with respect to a linear polarization component of said laser beam, said linear polarization component having an E vector a direction of which is rotated by a $\pi/4$ phase from an incident plane of the folding mirror,
    wherein said rear mirror has a surface on which an array of grooves is formed, said grooves being oriented in parallel with one another in one direction,
    wherein said grooves have a depth falling within the range between a wavelength of said laser beam and a skin depth on said coupling mirror or said folding mirror at a wavelength of said laser.

* * * * *